(12) United States Patent
Muller et al.

(10) Patent No.: US 7,256,413 B2
(45) Date of Patent: Aug. 14, 2007

(54) DEVICE AND PROCESS FOR READING OUT X-RAY INFORMATION STORED IN A PHOSPHOR PLATE (75) Inventors: Roland Muller, Munich (DE); Gunther Schindlbeck, Munich (DE); Volkmar Voigtlander, Eichenau (DE); Peter Schwelle, Weilheim (DE); Olaf Klabunde, Giengen/Brenz (DE); Andreas Dier, Munich (DE); Jean-Didier Labarte, Munich (DE); Edwin Kieselbach, Manching (DE); Rudolf Werkstetter, Perach (DE); Werner Stahl, Kirchheim (DE); Johannes Holzl, Grasbrunn (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 16 days.

(21) Appl. No.: 11/232,777

(22) Filed: Sep. 22, 2005

(65) Prior Publication Data
US 2006/0091336 A1   May 4, 2006

(30) Foreign Application Priority Data
Sep. 22, 2004   (EP) ................................. 04104603

(51) Int. Cl.
G01N 23/04   (2006.01)
(52) U.S. Cl. .................................... 250/584
(58) Field of Classification Search ............. 250/580, 250/581, 584, 89
See application file for complete search history.

(56) References Cited

U.S. PATENT DOCUMENTS

| | | | |
|---|---|---|---|
| 4,737,641 A * | 4/1988 | Lange et al. ................ 250/585 |
| 4,893,011 A | 1/1990 | Bauer et al. | |
| 4,908,514 A | 3/1990 | Bauer et al. | |
| 4,965,455 A | 10/1990 | Schneider et al. | |
| 5,340,995 A | 8/1994 | Verbeke et al. | |
| 5,413,265 A | 5/1995 | Stahl et al. | |
| 6,346,714 B1 | 2/2002 | Mueller et al. | |
| 6,437,359 B1 | 8/2002 | Hall et al. | |
| 6,703,636 B1 | 3/2004 | Gebele et al. | |
| 6,756,602 B2 * | 6/2004 | Otokuni ..................... 250/584 |
| 6,897,453 B2 | 5/2005 | Stahl et al. | |
| 2003/0057389 A1 | 3/2003 | Gebele et al. | |
| 2003/0128815 A1 | 7/2003 | Stahl et al. | |
| 2004/0004198 A1 | 1/2004 | Stahl | |
| 2004/0004871 A1 | 1/2004 | Stahl et al. | |
| 2004/0104364 A1 | 6/2004 | Stahl | |
| 2005/0104011 A1 | 5/2005 | Schindlbeck et al. | |
| 2005/0218355 A1 | 10/2005 | Melzer et al. | |

(Continued)

FOREIGN PATENT DOCUMENTS

DE   19646607   2/1998

(Continued)

*Primary Examiner*—David Porta
*Assistant Examiner*—Marcus Taningco
(74) *Attorney, Agent, or Firm*—Houston Eliseeva LLP (57) ABSTRACT A device for reading out X-ray information stored in a phosphor plate for simplified and solid guiding and/or holding of phosphor plates, with at the same time a high degree of compactness, includes: a device for holding and/or conveying the phosphor plate in an orientation inclined by an inclination angle α in relation to a vertical in which the phosphor plate is flat in form; and a read-out device for reading out the flat phosphor plate inclined by the inclination angle α in relation to the vertical.

20 Claims, 3 Drawing Sheets

U.S. PATENT DOCUMENTS

2005/0260517 A1    11/2005    Schindlbeck et al.

FOREIGN PATENT DOCUMENTS

| EP | 1014684 | 6/2000 |
|----|---------|--------|
| EP | 1209517 | 5/2002 |
| EP | 1321804 | 6/2003 |
| EP | 1324117 | 7/2003 |
| EP | 1324118 | 7/2003 |
| EP | 1533654 | 5/2005 |

\* cited by examiner

DEVICE AND PROCESS FOR READING OUT X-RAY INFORMATION STORED IN A PHOSPHOR PLATE

The invention relates to a device and to a corresponding process for reading out X-ray information stored in a phosphor plate.

Generic devices for this process are used, in particular for medical purposes, in the field of computer radiography (CR). Here, X-rays are recorded in so-called storage phosphors, whereby the X-ray radiation passing through an object, for example a patient, is stored as a latent picture in a storage phosphor layer. In order to read out the stored picture, the storage phosphor layer is irradiated with stimulation light, and so stimulated into emitting emission light, the intensity of which is dependent upon the respectively stored picture information. The emission light is collected by an optical detector and converted into electric signals which can be further processed as required and shown on a monitor or on a corresponding display unit, such as a printer.

U.S. Pat. No. 6,437,359, herein incorporated by reference in its entirety for background information only, describes a device wherein a phosphor plate located within a cassette is removed from the cassette using an extraction rod and conveyed in a vertical direction past a read-out station. In order to guide the phosphor plate, plate guides and guide rolls are provided. So that the storage phosphor plate lies against the plate guides or guide rolls during conveyance, the extraction rod is rotated slightly, so that the storage phosphor plate is pressed against the plate guides or the guide rolls. This type of mechanism for rotating the extraction rod is relatively complex and prone to interference.

SUMMARY OF THE INVENTION

It is the object of the invention to provide a device and a corresponding process for reading out storage phosphor plates with simplified and solid guiding or holding of the phosphor plates with at the same time a high degree of compactness.

The device is characterized by a device for holding and/or conveying the phosphor plate in an orientation inclined by an inclination angle in relation to the vertical in which the phosphor plate is flat in form, and by a read-out device for reading out the flat phosphor plate inclined by the inclination angle in relation to the vertical.

With the process the storage, phosphor plate is read out while it is inclined by an inclination angle in relation to the vertical and is flat in form.

Due to the inclination of the storage phosphor plate in relation to the vertical according to the invention, it is possible for the phosphor plate to be pressed against the corresponding support and/or guide elements due to its own weight, and to be supported without any need for any additional pressing mechanism. In this way, the mechanism required for the secure conveyance and/or holding of the phosphor plate is simplified. Because the phosphor plate must in general only be inclined slightly, e.g. by a few degrees, in relation to the vertical in order to achieve the advantages of the invention, at the same time a high degree of compactness is guaranteed in comparison to known devices whereby storage phosphor plates are read out in a horizontal orientation.

Preferably, in order to hold and/or convey the storage phosphor plate, the device includes one or more support elements which are arranged in such a way that the phosphor plate inclined in relation to the vertical can lie on the support elements due to its own weight.

The support elements can be guide elements such as guiding skids or guide rolls which guide the storage phosphor plate during its conveyance.

In addition or alternatively, the support elements include a flat support inclined in relation to the vertical on which the phosphor plate can lie, in particular during read-out and/or during conveyance. In this way it is guaranteed in a simple manner that the phosphor plate maintains a flat form, in particular during read-out and/or during conveyance so that the mechanical stress applied to the phosphor plate is reduced to a minimum.

Preferably, the support is provided with an attracting device so that the phosphor plate can be pulled onto the support. The phosphor plate is thus held on the support by its own weight and additionally by the attracting device so that the inclined orientation in relation to the vertical of the phosphor plate is guaranteed with a particularly high degree of reliability. The attracting device can include suction nozzles, for example, which are connected to a vacuum pump. The storage phosphor plate is thus pulled onto the support by suction. Alternatively however, magnets can also be provided so that a storage phosphor plate provided with corresponding magnetic substances can be pulled by the support.

With another embodiment of the invention, a first drive device is provided which moves the read-out device during read-out relative to the phosphor plate which is inclined in relation to the vertical. Preferably, the plate lies here on the flat support. When using so-called line scanners a whole line of the phosphor plate can be read out by the read-out device at one time, and a particularly compact structure of the device is achieved.

In an alternative embodiment of the invention, a second drive device is provided which moves the phosphor plate inclined in relation to the vertical, in particular together with the flat support, during read-out, relative to the read-out device. This embodiment is particularly advantageous if the read-out device includes a so-called flying spot scanner with which an individual laser beam is deflected by a rotating mirror, and thus samples, point by point, individual lines of the phosphor plate to be read out. Because this type of scanner generally react sensitively to vibration, it is often integrated and fixed with the respective read-out devices.

It is also preferred to provide an insertion device into which a cassette, within which the phosphor plate is located, can be inserted, the insertion device being designed in such a way that the inserted cassette and/or the phosphor plate located within the cassette, is inclined in relation to the vertical. In this way it is ensured that when being removed from the cassette, the storage phosphor plate located within the cassette can lie on an inner wide side of the cassette due to its own weight, and be guided by the same. In this way, when removing the storage phosphor plate from the cassette, any additional guide elements can be dispensed with.

Conveyance of the phosphor plate in the device according to the invention preferably also takes place on a conveyance level inclined in relation to the vertical. In this way it is ensured that the flat storage phosphor plate is not bent or buckled during its conveyance so that the mechanical stress applied to the storage phosphor plate during its conveyance is greatly reduced. Preferably, the phosphor plate located within the cassette lies on the conveyance level so that the phosphor plate is not bent on the conveyance level when being removed from the cassette and during conveyance.

According to the invention, the inclination angle of the phosphor plate and/or the support and/or the conveyance level and/or the inserted cassette or the phosphor plate located within the cassette has a value of between 3° and 15°. In this way, a high degree of reliability is guaranteed during the read-out and conveyance of the phosphor plate, also with a high degree of compactness.

Additional features and advantages of the invention are given in the following description of preferred embodiments and examples of applications, wherein reference is made to the attached drawings.

BRIEF DESCRIPTION OF THE DRAWINGS

FIG. 1 shows a) a highly schematised representation of a device according to the invention at a first point in time in a front view and b) in a side view;

FIG. 2 shows a) the device illustrated in FIG. 1 at a second point in time in a front view and b) in a side view;

FIG. 8 shows in a) to c) another embodiment of a device according to the invention in a side view at a first, second and third point in time.

DETAILED DESCRIPTION OF THE PREFERRED EMBODIMENTS

Figure 1A:
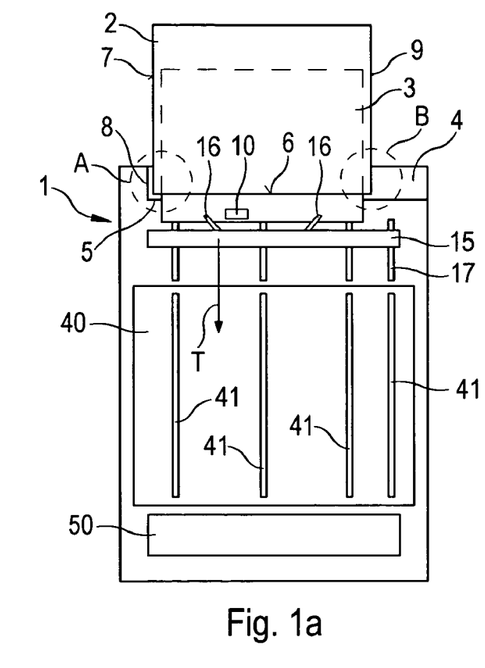
Figure 1B:
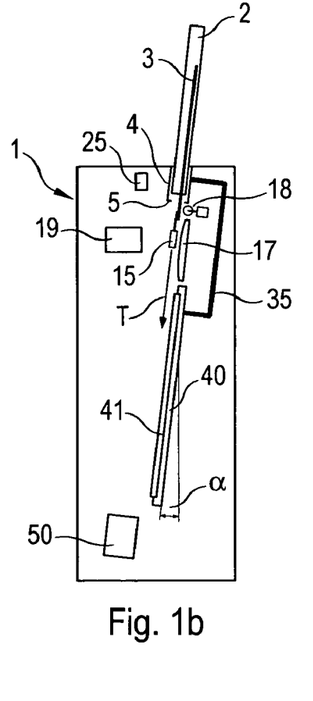

FIGS. 1a and 1b show an example of the device 1 according to the invention in a front and a side view. In the upper region of the housing of the device 1 there is an insertion device which in this example is in the form of a cassette holding slot 4. The cassette holding slot 4 is designed such that a cassette 2 inserted into the slot together with the storage phosphor plate 3 located within the same is inclined by an inclination angle in relation to the vertical. The inclination angle is preferably between approximately 3° and 15°.

In the lower region of the cassette holding slot 4 an oblong insertion opening 5 is provided through which the phosphor plate 3 located within the cassette 2 can be conveyed into the inside of the housing of the device 1. The insertion opening 5 is oblong or slit-shaped in form, its length being at least as great as the corresponding length of the largest phosphor plate format to be read out in the device 1. The width of the insertion opening 5 is selected to be sufficiently great so that the phosphor plate 3 is not obstructed by the insertion opening 5 when removing it from the cassette 2, even with small position fluctuations.

The cassette 2 lies with a first narrow side 6 on the floor of the cassette holding slot 4, and lies with a second narrow side 7 against a stop 8 which is provided at one end of the cassette holding slot 4.

Figure 3:
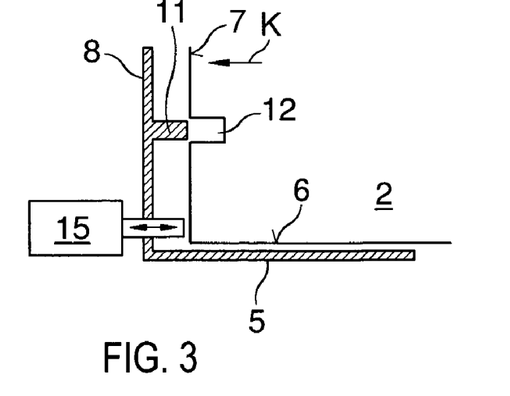
FIG. 3 shows a cross-section through an insertion device in a region of a stop in a front view.

Section A marked in FIG. 1a is shown in enlarged form in FIG. 3. On the stop 8 a protrusion 11 is provided which can engage into a corresponding, complementary indentation 12 in the cassette 2 and fix this in this way in the cassette holding slot 4. While the cassette 2 is being pushed against the stop 8 in direction K as it is being inserted into the cassette holding slot 4 and the protrusion 11 can engage in the indentation 12 in the cassette 2, a linear sensing device 15 is activated at the same time by the lower corner of the cassette 2, and the sensing device sends a signal corresponding to the respective position of the cassette 2. This signal determines whether the cassette 2 is already lying fully against the stop 8.

If for example the cassette 2 is moved with a wrong narrow side in direction K towards the stop 8, the protrusion 11 of the stop 8 cannot engage in a corresponding indentation in the cassette 2 so that the cassette 2 comes to stand approximately at the height of the protrusion 11. In this case, the linear sensing device 15 does not send a correspondingly high signal so that it is understood that the inserted cassette 2 is falsely orientated. In this case, a corresponding error signal is issued in a suitable display unit on the device.

Furthermore, the linear sensing device 15 is used to determine the exact position of the cassette 2 in relation to the stop 8, or the position of the insertion opening 5. The linear sensing device 15 can thus also register a slight tipping of the cassette 2 in relation to the horizontal.

The combination of the protrusion 11 against the stop 8 and the corresponding indentation 12 in the cassette 2 on the one hand with the linear sensing device 15 in the region of the stop 8 on the other hand thus makes it possible in a simple way to provide reliable recognition of the correct orientation and exact position of an inserted cassette 2. Only when the linear sensing device 15 sends a corresponding signal will further process steps be initiated for the processing of the phosphor plate 3 located within the cassette 2.

In a next step the cassette is fixed in the region of the third narrow side 9 of the cassette 2 lying opposite the second narrow side 7 in conjunction with a light seal on the insertion opening 5. In the following this is described in greater detail with reference to FIGS. 4 to 6.

Figure 5:
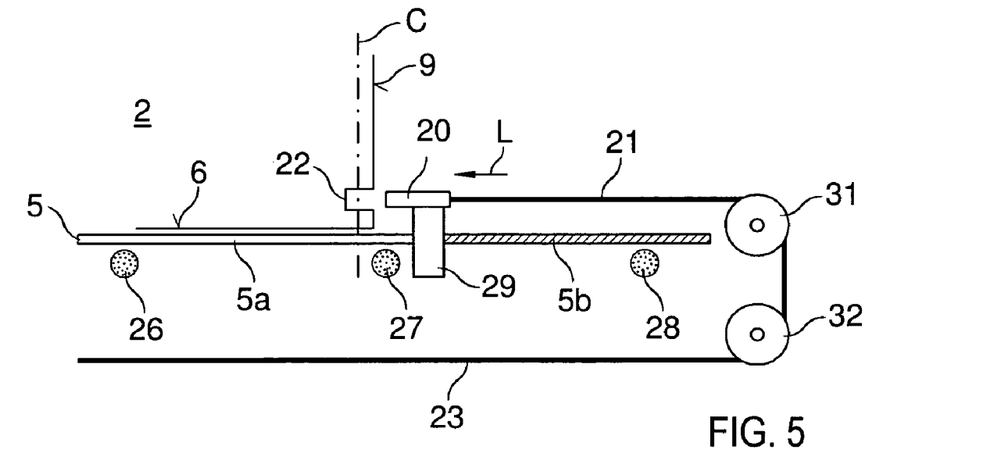
FIG. 5 shows a cross-section through an insertion device in a region of a fixing element and a closure mechanism in a front view.

FIG. 5 shows section B marked in FIG. 1a in enlarged form. A fixing element 20 attached to an endless belt 23 is moved in the longitudinal direction L of the insertion opening 5 towards the third narrow side 9 of the cassette 2, and here can engage in another indentation 22 of the cassette 2, and in this way fix the cassette 2 by form-locking. By using a corresponding pressing force, a force closure fixing of the cassette 2 is achieved at the same time, in particular by pressing onto the stop 8 located on the opposite second narrow side 7. The light seal of the insertion opening 5 is created here both by the first narrow side 6 of the cassette 2 which covers a first section 5a of the insertion opening 5 so as to prevent light penetration, and by a closure mechanism 21 which is formed by a part of the endless belt 23 and covers a second section 5b of the insertion opening 5.

Figure 4:
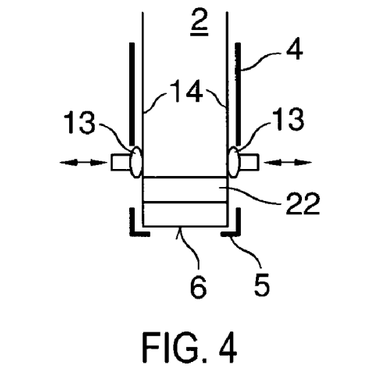
FIG. 4 shows a cross-section through an insertion device with a cassette located within the insertion device in a side view.

Alternatively, or in addition, the first section 5a of the insertion opening 5 can be sealed against light penetration by other suitable means. One possible variation is shown in FIG. 4 which shows a cross-section through the insertion device 4 with the cassette 2 located within it, along the cross-section level C (see FIG. 5) in a side view. In this example, sealing lips 13 are provided which can extend sideways into the inside of the cassette holding slot 4 and lie against the wide sides 14 of the cassette 2. In this example, the sealing lips 13 are in the form of hollow lips and preferably respectively run parallel to the longitudinal direction L (see FIG. 5) of the insertion opening 5 or to the first narrow side 6 of the cassette 2.

In FIG. 4 one can also see the indentation 22 in which the fixing element 20 (see FIG. 5) can engage and thus fix the cassette 2 by form locking and, if required, force closure.

In the example given in FIG. 5, photo sensors 26 to 28 are also provided which can be interrupted by a tab 29 attached to the fixing element 20. These photo sensors 26 to 28 are correspondingly allocated to the different cassette formats to be processed so that a photo sensor 26, 27 or 28 is only interrupted by the tab 29 and a corresponding signal sent if a cassette permissible for this device with a corresponding format is inserted in the correct position and with the right orientation. In association with the stop 8 described in greater detail in connection with FIG. 3, even greater reliability for the recognition of the right orientation and correct position of the respectively inserted cassette 2 is guaranteed by the photo sensors 26, 27 and 28.

The endless belt 23 is preferably in the form of a toothed belt. In order to guide and drive the endless belt 23, rollers 31 and 32 are provided, one of the rollers 31 or 32 being in the form of a roller drive which can move the endless belt 23 and so also the closure mechanism 21 as well as the fixing element 20 attached to it parallel to the longitudinal direction L of the insertion opening 5.

Figure 6:
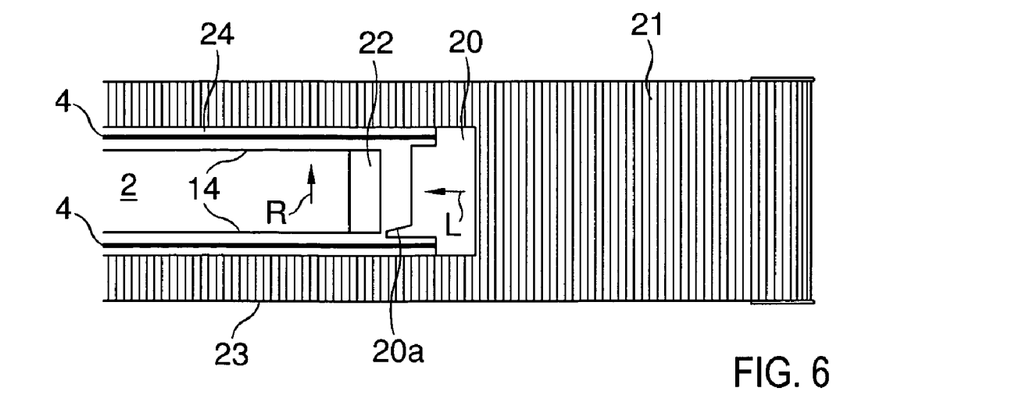
FIG. 6 shows a cross-section through an insertion device in a region of a fixing element and a closure mechanism in an overhead view.

FIG. 6 shows an overhead view of the section of the device according to the invention shown in FIG. 5. As can be seen, the endless belt 23 has a cut-out 24 in the region of the inserted cassette 2 so that this can run on both sides of the cassette 2. On one end of the cut-out 24 the fixing element 20 is attached, which together with the closure mechanism 21 attached onto this can be moved toward the cassette 2 or away from the cassette 2. The fixing element 20 has a region 20a which runs at a slant or in the form of a wedge, so that the cassette 2 is pressed in a direction R against a wall of the cassette holding slot 4 when the fixing element 20 extends into the indentation 22 in the cassette 2.

The fixing element 20 is preferably fastened onto a slide which is movably mounted with rollers on tracks running on both sides of the cassette 2 (not shown).

On the edge of the phosphor plate 3 (see FIG. 1a) there is an electronic storage unit 10 for storing data such as data relating to the format of the cassette 2, the phosphor plate 3 and the total thickness of the phosphor plate 3 which is made up from a substrate material and a phosphor layer located on top of the substrate material, and typically having a total thickness of between approximately 1 and 3 mm.

The electronic storage unit 10 is preferably in the form of a so-called RF-Tag which can be read out by an RF reader 25 by radio frequency radiation. The data on the format of the cassette 2 read out from the electronic storage unit 10 can be compared with the information obtained from the photo sensors 26 to 28 and tested for plausibility. If there is, for example, a non-desirable object between the third narrow side 9 of the cassette 2 and the fixing element 20, such as a hand or a finger of a user, the photo sensor signal obtained here is not consistent with the cassette format established in the electronic storage unit 10. In this case, the fixing process can be interrupted, and a corresponding error signal is issued.

Furthermore, a so-called clamping force sensor (not shown) can be positioned on the circulating endless belt 23, and this can register the tension of the endless belt 23 when fixing the cassette 2. By determining the belt tension, the endless belt 23 drive can be controlled in such a way that the fixing element 20 presses with a pre-determinable force onto the third narrow side 9 of the cassette 2, and in so doing, fixes it. Typical forces here are those between 10 and 100 N. In this way, even with cassettes of different formats, a format-independent pressing force and fixing of the cassette in the cassette holding slot 4 is achieved. Furthermore, it can be guaranteed by a corresponding specification of the pressing force that the cassette 2 is not damaged by excessive forces while being fixed. Furthermore, the risk of injury is reduced in cases where a body part, such as a hand or a finger of a user inadvertently comes between the cassette 2 and the fixing element 20 or stop 8.

On the first narrow side 6 of the cassette 2 a flap (not shown) is provided which closes the cassette 2 to form a light seal. This flap is unlocked with a suitable opening mechanism (not shown), the phosphor plate 3 at the same time being locked in the cassette 2 so that it cannot fall out of the cassette 2. This type of cassette with a corresponding unlocking and locking mechanism is described in greater detail in the European patent application number 01104202.1 herein incorporated by reference in its entirety for background information only.

Preferably, the opening of the flap, which preferably takes place by a simple translatory movement of corresponding opening pins in the region of the first narrow side 6 of the cassette 2, is mechanically coupled with the seal on the wide sides 14 of the cassette 2 by the sealing lips 13 already described above (see FIG. 4).

A conveyance device 15 can now approach the cassette 2 and the phosphor plate 3 located within it, and grasp the latter by means of grasping arms 16. Hooks and/or cut-outs suitable for this are provided on the phosphor plate 3, as described in greater detail in particular in the published European patent applications EP 1 321 804 and EP 1 324 118, both herein incorporated by reference in their entirety for background information only.

The phosphor plate 3 which is still locked in the cassette 2 can now be unlocked and removed from the cassette 2 by a downwards movement of the conveyance device 15 in conveyance direction T. The conveyance direction T here also involves a final inclination angle in relation to the vertical, and is preferably selected such that the phosphor plate 3 can be removed from the cassette and conveyed essentially without any change in direction, for instance on just one conveyance level.

The phosphor plate 3 is now conveyed in conveyance direction T to a support 40. Spacers 41 are provided on the support 40 which are extended over the support 40 during conveyance of the phosphor plate 3. Due to its own weight, the phosphor plate 3 then lies on the spacers 41 and is carried by these with very little friction.

Figure 7:
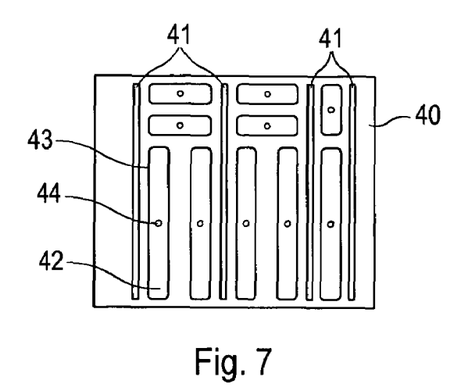
FIG. 7 shows a preferred embodiment of a support.

The structure of a support 40 formed in this way is shown in detail in FIG. 7. As can be seen, as well as the already mentioned retractable and extendable spacers 41, the support 40 has several segments 42 by means of which the storage phosphor plate 3 located on the support 40 can be pulled onto the support 40. In the example shown here, the individual segments 42 each include a rubber border strip 43 and a suction nozzle 44 within each segment 42 which is connected to a vacuum pump (not shown). By an appropriate arrangement of segments 42 of different sizes, the attracting and suction effect of which can preferably be controlled separately, it is possible to pull the phosphor plate 3 onto the support 40 in a simple manner adapted to the respective format.

The support 40 is also inclined by an inclination angle $\alpha$ in relation to the vertical.

If the phosphor plate 3 has arrived at the region of the support 40, the plate, due to its own weight, can lie on the support 40 or the extended spacers 41 without additional guiding or pressing elements being required. The spacers 41 can now be retracted into the support 40 and the phosphor plate 3 moves closer to the support 40 due to its own weight, and is finally additionally pulled onto the support 40 by turning on the vacuum at the corresponding suction nozzles 44 of the individual segments 42.

Figure 2A:
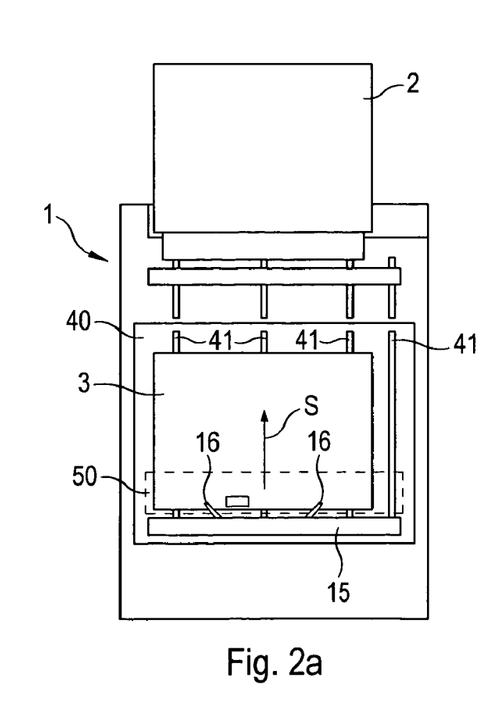
Figure 2B:
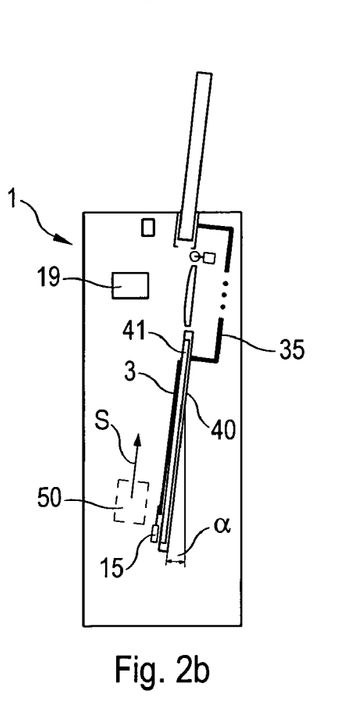

This state is illustrated in FIGS. 2*a* and 2*b*. In this example of an embodiment, the conveyance device 15 is configured in such a way that it furthermore holds the phosphor plate 3 with its grasping arms 16 while the plate already lies securely on the support 40. In this way a particularly secure hold of the phosphor plate 3 on the support 40 is guaranteed. Moreover, in this way a new grasping process can be omitted before starting to convey the phosphor plate 3 back into the cassette 2.

When the phosphor plate 3 lies securely on the support 40, a read-out device 50 moves upwards out of its original parking position (see FIGS. 1*a* and 1*b*) beneath the lower end of the support 40 in direction S onto the phosphor plate 3. At the same time, by a corresponding spacing mechanism (not shown), a corresponding distance between the read-out device 50 and the support 40 is set, the distance set being dependent upon the overall thickness of the phosphor plate 3 read out from the electronic storage unit 10.

The read-out device 50 can now read out, line for line, the X-ray information stored in the phosphor plate 3 while it moves in the direction S over the phosphor plate 3. The read-out device 50 is preferably a so-called line scanner with which a whole line of the phosphor plate 3 is respectively stimulated with stimulation light, and the emission light thus produced is collected by a linear, locally releasing detector. This type of line scanner is described in greater detail for example in the German disclosure document DE 197 52 925 herein incorporated by reference in its entirety for background information only.

Following the read-out from the phosphor plate 3, the distance of the read-out device 50 from the support 40 is increased again, and the read-out device 50 travels back to its original parking position at the lower end of the support 40. The phosphor plate 3 is released from the support 40 when air is let into or pumped into the respective suction nozzles 44 of the individual segments 42.

Before starting the return conveyance, the spacers 41 are extended out of the support 40 again. The phosphor plate 3 can now be conveyed back into the cassette 2 by the conveyance device 15.

While being conveyed back, any remaining X-ray information in the phosphor plate 3 is deleted by a deletion lamp 19 located in the region beneath the cassette holding slot 4.

Between the support 40 and the cassette holding slot 4 guide elements are provided which, in particular during the return conveyance, ensure that the phosphor plate 3 is reliably guided. Due to its own weight, the phosphor plate 3 here lies against the guide elements which in the example shown are in the form of guiding skids 17 and guide rolls 18.

When the phosphor plate 3 is fully inserted in the cassette 2 once again, it can once again be locked into the cassette with the locking mechanism already described above. The grasping arms 16 of the conveyance device 15 now let go of the phosphor plate 3, and the conveyance device 15 travels back to its parking position. The cassette 2 is now closed by shutting the flap described above, the sealing lips 13 (see FIG. 4) are moved back from the wide sides 14 of the cassette 2, and the fixing element 20 releases the cassette 2 along with the closure mechanism 21 located on the same, and the cassette can now be removed again from the cassette holding slot 4 by a user.

Preferably, a coupling device 35—only shown in a highly schematised form in FIGS. 1*b* and 2*b*—is provided which can mechanically couple the cassette holding slot 4 with the support 40 during the conveyance of the phosphor plate 3 (see FIG. 1*b*) and mechanically uncouple it while the storage phosphor plate 3 is being read out. For simplification, the mechanical uncoupling is symbolised by the dotted line of the coupling device 35 in FIG. 2*b*.

In this way, on the one hand, particularly secure conveyance of the phosphor plate 3 from the cassette to the support 40 is guaranteed because the cassette 2 located within the cassette holding slot 4 and the support 40 can not move relative to one another due to the mechanical coupling.

By the mechanical uncoupling of the support 40 being suspended movably, for instance by elastic elements, in the housing of the device 1, it is also possible for vibrations of the housing, in particular due to external impacts or shaking not, or only to a small extent, to be transferred to the support 40. In this way, a particularly secure and reliable read-out of the phosphor plate 3 is guaranteed.

In an alternative embodiment of the device shown in FIGS. 1 and 2, the phosphor plate 3 is read out while this is being conveyed by the conveyance device 15 and 16 on a conveyance level inclined in relation to the vertical. The read-out device 50 is arranged in such a way (not shown) that the phosphor plate 3 is conveyed past the read-out device 50 and can thus be read out by the same while the phosphor plate 3 is conveyed downwards away from the cassette 2 or upwards towards the cassette 2. The read-out device 50 can be located near to the deletion device 19 shown in FIGS. 1 and 2 so that the phosphor plate 3 can be read out when it is removed from the cassette 2, and deleted when it is conveyed back into the cassette 2.

Figure 8A:
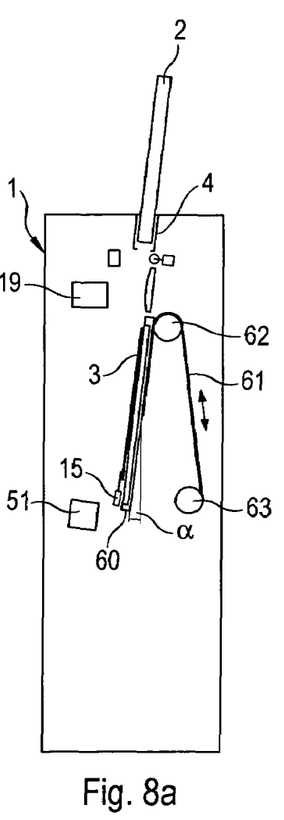
Figure 8B:
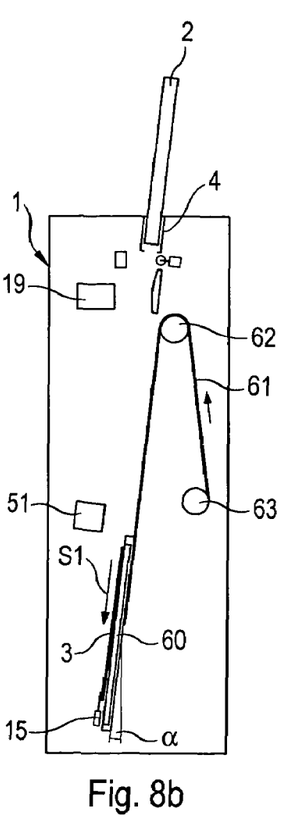
Figure 8C:
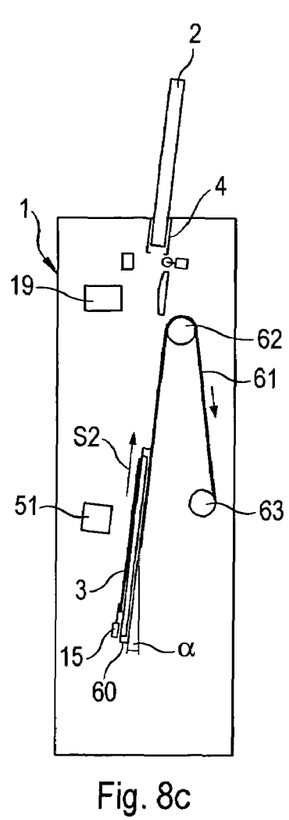

In FIGS. 8*a*, 8*b* and 8*c*, an alternative embodiment of the device according to the invention is respectively shown in a side view. The fixing of the cassette 2 in the cassette holding slot 4 and the removal of the phosphor plate 3 from the cassette 2 by the conveyance device 15 happen according to the above embodiments in connection with FIGS. 1 to 6.

Unlike the examples of embodiments described above, the support 60 on which the phosphor plate 3 is located during the read-out is not securely fastened, but is conveyed past the securely fastened read-out device 51 by a suitable drive device. In the examples shown, the drive device includes a cable or strap winch 61 which is attached to the support 60, is turned round by a pulley 62, and driven by a drive roll 63.

At the point in time illustrated in FIG. 8*a*, the phosphor plate 3 lies flat on the support 60 which is inclined by an inclination angle α in relation to the vertical. In order to guarantee a secure hold and positioning of the phosphor plate 3 on the support 60 during read-out, the support 60 is provided with appropriate attracting devices, such as suction nozzles (as in FIG. 7) or suction cups, or holding devices. Furthermore, the conveyance device 15, with which the phosphor plate 3 is removed from the cassette 2 and conveyed to the support 60, is also engaged with the phosphor plate 3 by means of which the latter is additionally held.

By rotating the drive roll 63, the phosphor plate 3, together with the support 60, can now be lowered in direction S1. A point of time during the lowering is shown in FIG. 8*b*. Here, the phosphor plate 3 is moved in direction S1 past the securely fastened read-out device 51 and can be read out by the same.

The read-out device 51, as in the case of the read-out device 50 (FIGS. 1 and 2) can be a so-called line scanner.

Preferably, the read-out device 51 is in the form of a so-called flying spot scanner with which a laser beam deflected by a rotating mirror stimulates the storage phosphor plate point by point, and the emission light respectively stimulated by a photomultiplier is collected.

In an alternative embodiment, the phosphor plate 3 can only be read out on its way back, as it is moved past the read-out device 51 in direction S2 (see FIG. 8c). Dependent upon the design of the drive device 61 to 63, in particular of the drive used for the drive roll 63, in this way, the phosphor plate 3 can be particularly reliably conveyed past the read-out device 51 with very few fluctuations.

Independent of the respective movement direction S1 or S2, the phosphor plate 3 is inclined by inclination angle α in relation to the vertical during read-out.

After the read-out, the phosphor plate 3 has returned to the position shown in FIG. 8a, and can—similar to the examples in FIGS. 1 and 2—be conveyed back by the conveyance device 15 into the cassette 2. Any information remaining in the phosphor plate 3 is deleted here by turning on the deletion lamp 19.

The drive device described in FIGS. 8a, 8b and 8c can also be replaced by other suitable drive devices. For example, the support 60 from a so-called spindle drive (not shown) can be moved on a level inclined in relation to the vertical. Here, the support 60 is set in motion by one or more rotating shafts or spindles, arranged parallel to the support 60, driven by a motor.

The invention claimed is:

1. An X-ray read out device for reading out X-ray information stored in a phosphor plate, the device comprising:
   an apparatus for holding and/or conveying the phosphor plate in an orientation inclined by an inclination angle α in relation to the vertical, in which the phosphor plate is flat in form, the apparatus including one or more support elements which are arranged such that the phosphor plate inclined in relation to the vertical can lie on the one or more support elements due to the weight of the phosphor plate, and the one or more support elements include a first support inclined in relation to the vertical on which the phosphor plate lies during read-out and/or during conveyance; and
   a read-out device for reading out the flat phosphor plate inclined by the inclination angle α in relation to the vertical;
   wherein the first support further comprises several segments which each comprise a border strip and an attracting device, such as a suction nozzle, located within the border strip.

2. The X-ray read out device according to claim 1, wherein the segments are of different sizes.

3. The X-ray read out device according to claim 1, further comprising a first drive device which moves the read-out device during read-out relative to the phosphor plate inclined in relation to the vertical.

4. The X-ray read out device according to claim 3, further comprising a second drive device which moves the phosphor plate inclined in relation to the vertical relative to the read-out device, together with the support, during read-out.

5. The X-ray read out device according to claim 1, further comprising an insertion device into which a cassette in which the phosphor plate is located, can be inserted, the insertion device being designed such that the inserted cassette and/or the phosphor plate located within the cassette is inclined in relation to the vertical.

6. The X-ray read out device according to claim 1, further comprising a conveyance device for conveying the phosphor plate and for removing the phosphor plate from the inserted cassette on a conveyance level inclined in relation to the vertical.

7. The X-ray read out device according to claim 1, wherein the inclination angle α from the vertical of the phosphor plate and/or the support and/or the inserted cassette has a value of between 3° and 15°.

8. The X-ray read out device according to claim 1, wherein the first support further comprises spacers which can be extended over the first support during conveyance of the phosphor plate, the phosphor plate being capable of lying on and being guided by the spacers due to a weight of the phosphor plate.

9. An X-ray read out device for reading out X-ray information stored in a phosphor plate, the device comprising:
   an apparatus for holding and/or conveying the phosphor plate in an orientation inclined by an inclination angle α in relation to the vertical, in which the phosphor plate is flat in form, the apparatus including one or more support elements which are arranged such that the phosphor plate inclined in relation to the vertical can lie on the one or more support elements due to the weight of the phosphor plate, and the one or more support elements include a first support inclined in relation to the vertical on which the phosphor plate lies during read-out and/or during conveyance;
   a read-out device for reading out the flat phosphor plate inclined by the inclination angle α in relation to the vertical;
   an insertion device for insertion of a cassette in which the phosphor plate is located; and
   a coupling device for mechanically coupling the insertion device with the first support during conveyance of the phosphor plate, and mechanically uncoupling the insertion device from the first support during read-out of the phosphor plate.

10. The X-ray read out device according to claim 9, further comprising a conveyance device for conveying the phosphor plate and for removing the phosphor plate from the inserted cassette on a conveyance level inclined in relation to the vertical.

11. The X-ray read out device according to claim 9, wherein the inclination angle α from the vertical of the phosphor plate and/or the support and/or the inserted cassette has a value of between 3° and 15°.

12. The X-ray read out device according to claim 9, wherein the first support further comprises spacers which can be extended over the first support during conveyance of the phosphor plate, the phosphor plate being capable of lying on and being guided by the spacers due to a weight of the phosphor plate.

13. The X-ray read out device according to claim 9, further comprising a first drive device which moves the read-out device during read-out relative to the phosphor plate inclined in relation to the vertical.

14. The X-ray read out device according to claim 13, further comprising a second drive device which moves the phosphor plate inclined in relation to the vertical relative to the read-out device, together with the support, during read-out.

15. The X-ray read out device according to claim 9, wherein is designed such that the inserted cassette and/or the phosphor plate located within the cassette is inclined in relation to the vertical.

16. A process for reading out X-ray information stored in a phosphor plate, comprising the steps of:
   providing a storage phosphor plate being flat in form;
   inserting a cassette in which the phosphor plate is located into an insertion device, the phosphor plate being removed from the cassette and conveyed to a first support, and the phosphor plate is read out while lying on the first support, the insertion device being mechanically coupled with the first support during conveyance of the phosphor plate; and
   reading out information stored on the phosphor plate while the plate is inclined at an inclination angle $\alpha$ in relation to a vertical, the insertion device being mechanically uncoupled from the first support during reading out of the phosphor plate.

17. The process according to claim 16, further comprising the step of moving a read out device relative to the phosphor plate during the step of reading out information.

18. The process according to claim 16, further comprising the step of moving the inclined phosphor plate together with a second support, relative to a read out device during the step of reading out information.

19. The process according to claim 16, wherein the first support comprises spacers extending over the first support during conveyance of the phosphor plate, wherein the phosphor plate lies on and is guided by the spacers due to a weight of the phosphor plate.

20. The process according to claim 16, further comprising the step of conveying the phosphor plate on a conveyance level inclined in relation to a vertical, when the phosphor plate is being removed from a cassette.

* * * * *